United States Patent [19]
Lembcke et al.

[11] Patent Number: 6,158,714
[45] Date of Patent: Dec. 12, 2000

[54] ADJUSTABLE ORIFICE VALVE

[75] Inventors: Jeffrey J. Lembcke, Houston; Kurt A. Hickey, Humble, both of Tex.

[73] Assignee: Baker Hughes Incorporated, Houston, Tex.

[21] Appl. No.: 09/152,444

[22] Filed: Sep. 14, 1998

[51] Int. Cl.[7] .................................................. F16K 31/363
[52] U.S. Cl. ...................... 251/122; 251/63.5; 166/320; 166/332.1
[58] Field of Search .................................. 251/63.5, 122, 251/63.6, 903, 120, 121; 166/319, 320, 332.1, 332.4; 405/191; 138/46

[56] References Cited

U.S. PATENT DOCUMENTS

| | | | |
|---|---|---|---|
| 3,757,816 | 9/1973 | Price | 137/498 |
| 4,723,606 | 2/1988 | Vinzant et al. | 166/319 |
| 4,789,132 | 12/1988 | Fujita et al. | 251/129.11 |
| 4,944,350 | 7/1990 | Airey | 166/373 |
| 5,176,164 | 1/1993 | Boyle | 137/155 |
| 5,618,022 | 4/1997 | Wallace | 251/62 |
| 5,771,974 | 4/1997 | Stewart et al. | 166/336 |
| 5,803,167 | 9/1998 | Bussear et al. | 166/65.1 |

FOREIGN PATENT DOCUMENTS 2 253643  9/1992  United Kingdom .

Primary Examiner—Henry J. Recla
Assistant Examiner—Peter deVore
Attorney, Agent, or Firm—Duane, Morris & Heckscher LLP

[57] ABSTRACT

The invention relates to valves usable downhole and controlled from the surface hydraulically via control lines or by other techniques. The valve has a minimum flow passage which is preferably oriented along its longitudinal axis and a lateral flow passage which opens upon movement of a valve member via applied control pressure from the surface. Alternatively, the valve comprises a tapered needle movable in a throat. When the valve member shifts, additional flow area is exposed to control the backpressure of a fluid by way of hydraulic pressure control from the surface via the control line. The hydraulic control can be with a single control line acting on a piston attached to the valve member with a return spring opposing such movement, or alternatively, can be carried out with a pair of control lines to actuate reverse movements of the valve member. A pressurized gas chamber can be used to act as the closing force opposing applied pressure from the control line for a return of the valve to its minimum flow or maximum throttle position. Alternatively, an acoustic, electric or other type of surface-directed signal can change the valve position.

13 Claims, 7 Drawing Sheets

ADJUSTABLE ORIFICE VALVE

FIELD OF THE INVENTION

The field of this invention relates to downhole throttling valves whose position can be adjusted over an operating range from control lines or other signaling techniques from the surface.

BACKGROUND OF THE INVENTION

A subsurface safety valve (SSV) is one commonly used type of down-hole valve which is controlled between a fully open or fully closed position by control lines extending from the valve, usually mounted in a tubing string to the surface.

Other applications require control of the flow as opposed to the on/off capabilities of an SSV. A particular example of this is in the application of a downhole oil/water separator where the valve is used to control the injection rate of the water back into the formation. Since formations change injectivity or resistance to injection of fluid over time, one way to maintain a near-constant backpressure on the separator is to adjust the outlet flow rate of separated water back to the formation. The apparatus of the present invention facilitates this procedure by providing infinite adjustability between a max and minimum flow for a given upstream pressure in the separator.

In the past, auxiliary controlled valves have been used in drillstrings as a signal source for transmitting information from the well to the surface where flushing fluid flows through the string and serves as the transmitting medium. Such a valve is illustrated in U.S. Pat. No. 4,519,574. This valve relies on down-hole differential pressures coupled with an auxiliary power source to operate a solenoid to control an associated hydraulic circuit for positioning the valve member in one of two extreme positions.

It is the object of the present invention to provide a simple valve design which allows throttling with control from the surface via a control line or another signaling technique. Another objective of one embodiment of the present invention is to allow a minimum flow, via a central opening, so that tools can be passed through the valve while it is in its minimum flow or maximum throttling position. Another objective of the present invention is to provide improved control for downhole operations where sensitivity is required to changing conditions which requires regulation of applied pressures in fluids being delivered downhole. Those and other advantages of the invention will become more apparent from a detailed description of the preferred embodiment which appears below.

SUMMARY OF THE INVENTION

The invention relates to valves usable downhole and controlled from the surface hydraulically via control lines or by other techniques. The valve has a minimum flow passage which is preferably oriented along its longitudinal axis and a lateral flow passage which opens upon movement of a valve member via applied control pressure from the surface. Alternatively, the valve comprises a tapered needle movable in a throat. When the valve member shifts, additional flow area is exposed to control the backpressure of a fluid by way of hydraulic pressure control from the surface via the control line. The hydraulic control can be with a single control line acting on a piston attached to the valve member with a return spring opposing such movement, or alternatively, can be carried out with a pair of control lines to actuate reverse movements of the valve member. A pressurized gas chamber can be used to act as the closing force opposing applied pressure from the control line for a return of the valve to its minimum flow or maximum throttle position. Alternatively, an acoustic, electric, motion, or light or other type of surface-directed signal can change the valve position.

DETAILED DESCRIPTION OF THE PREFERRED EMBODIMENT

Figure 1A:
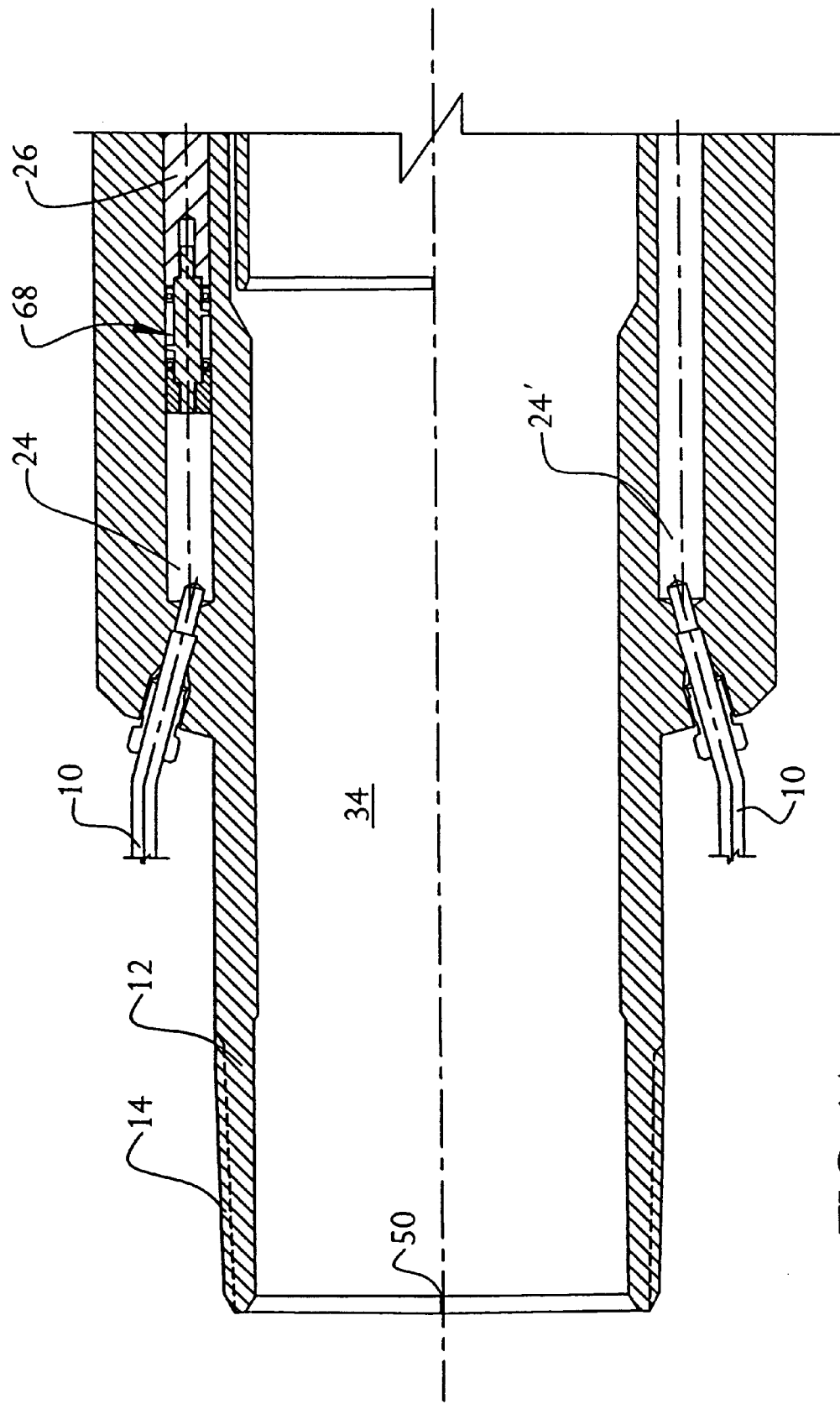
FIGS. 1a–1d are a sectional elevational split view of the preferred embodiment of the present invention.

As previously stated, downhole throttling valves are useful in a variety of applications. In the preferred embodiment, the application is fluid injection into the formation. Since the formation can have variability in its ability to absorb the injected fluid, a throttling valve can be used when a fluid is injected from the surface into the formation to stimulate subsequent production. Alternatively, in wells that are producing with the aid a downhole pump, separation of produced water from the hydrocarbons can be accomplished downhole with the output pressure of the downhole pump driving the produced fluid through a separator where the overhead hydrocarbons continue to the surface while the water, which is heavier, is reinjected. In order to make such separation equipment effective, the output from a separator, which can be of a cyclonic type, needs to be regulated to effectively separate the water from the hydrocarbon layer. While the overhead hydrocarbon layer can be easily regulated at the surface, the outlet water layer which is reinjected into the formation sees variability in the formation's ability to absorb the outlet water stream. Accordingly, the apparatus A of the present invention, in its preferred use, can be installed in the water outlet of a downhole separator to regulate the water flow out of the separator back to the formation. The apparatus A is controlled from the surface by a control line or lines 10 which run to the surface. Thus, the assembly as shown in FIGS. 1a–1d is installed in the water outlet of the separator which is not shown.

Referring to FIGS. 1a–1d, the apparatus A has an upper housing 12 with a thread 14 for connection to the outlet of a separator (not shown). The upper housing 12 is connected to body 16 at thread 18. The lower housing 20 is connected to body 16 at thread 22.

While multiple control lines 10 are shown in FIG. 1 a, those skilled in the art will appreciate that a single control line 10 is sufficient for extension from the surface to adjacent the upper housing 12. In the preferred embodiment, the branches of the control line 10 are in communication with discrete cavities 24 and 24', each of which is in communication with a rod piston 26 and 26', respectively. Those skilled in the art can appreciate that any number of individual rod pistons such as 26, can be used, or alternatively, the cavity 24 and 24', instead of being discrete cylindrical bores, can be one common annularly shaped cavity and use an annularly shaped piston 26. One of the disadvantages of using an annularly shaped piston is that the return spring 28 must resist a greater hydrostatic force from pressure in control line 10 and, therefore, for a given depth would need to be stiffer than the alternative, which is to use cylindrically shaped cavities, such as 24 and 24', in conjunction with rod pistons such as 26 and 26'. Those skilled in the art will also appreciate that the number of pistons, such as 26, can be varied, as well as their diameters to suit the particular application.

Figure 1C:
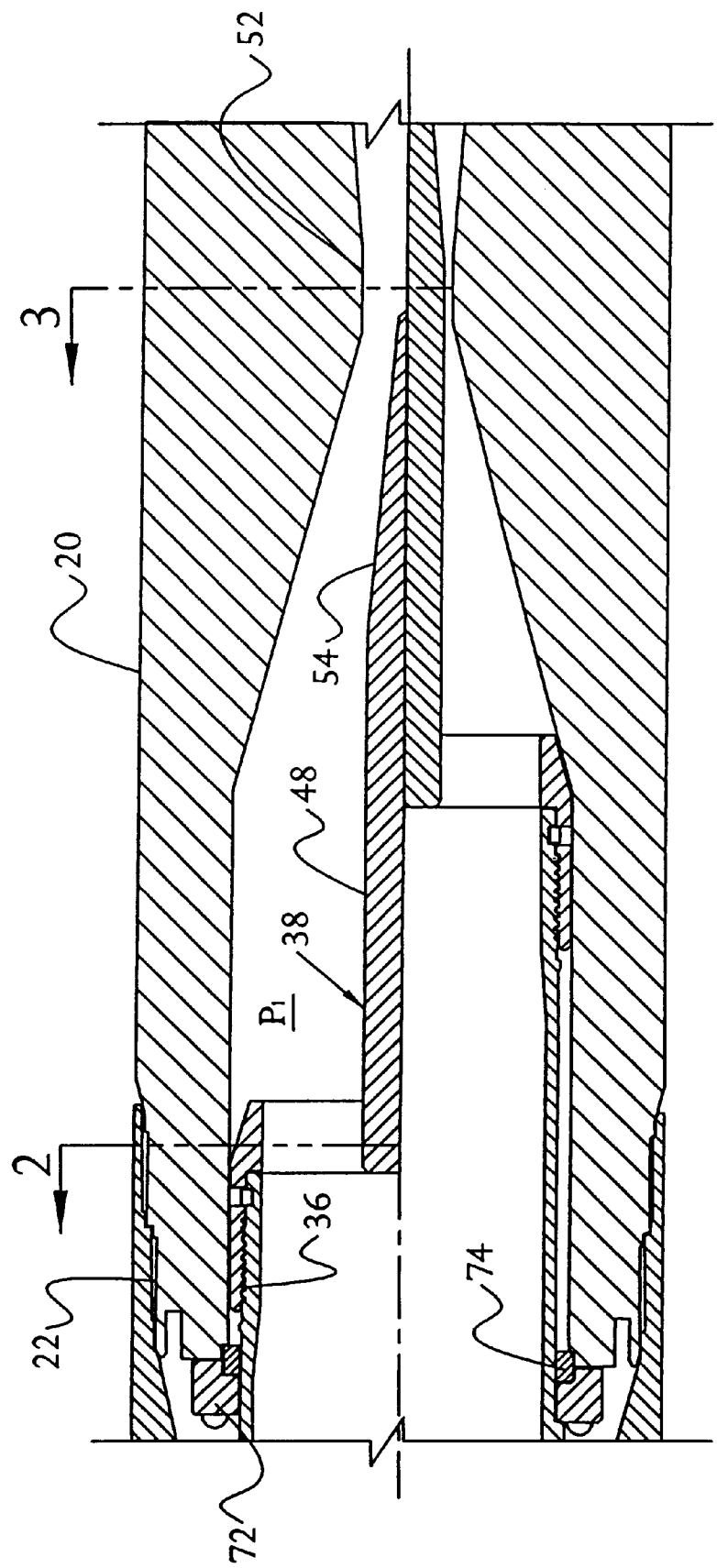
Figure 1D:
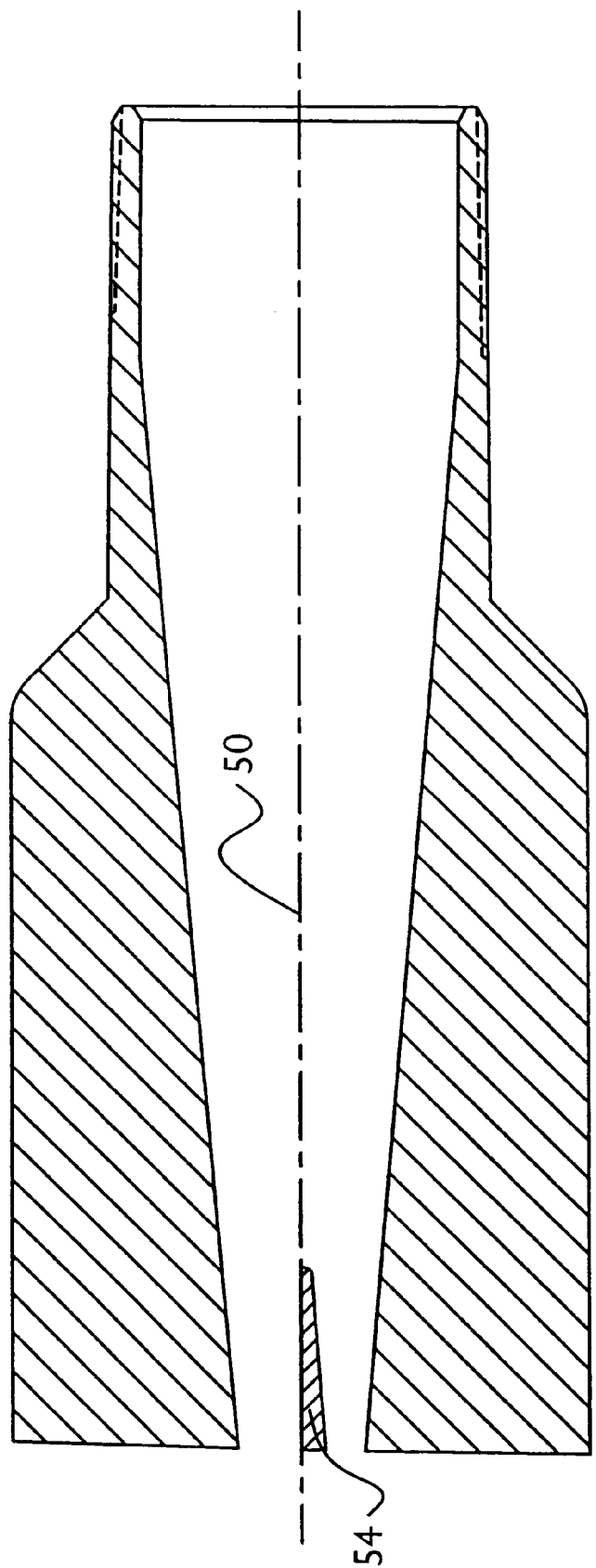
Figure 2:
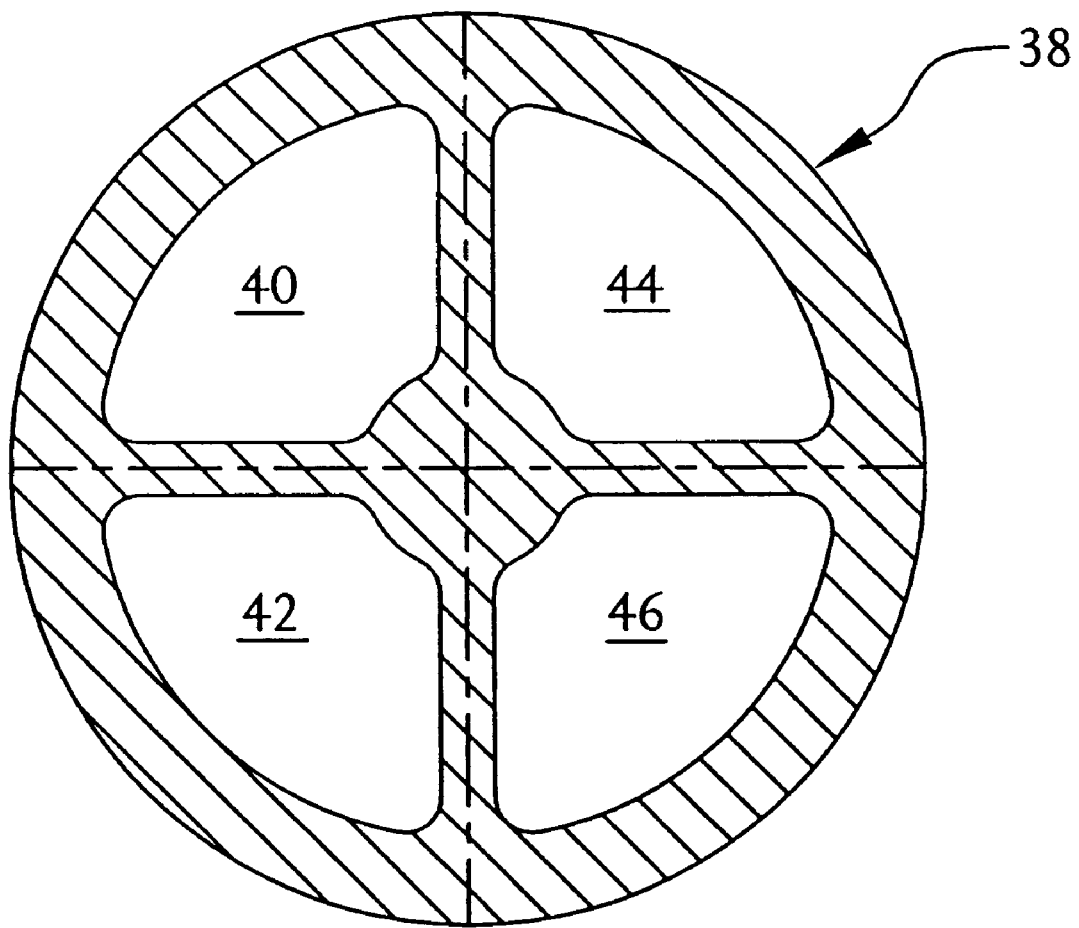
FIG. 2 is section view through line 2–2 of FIG. 1c.
Figure 3B:
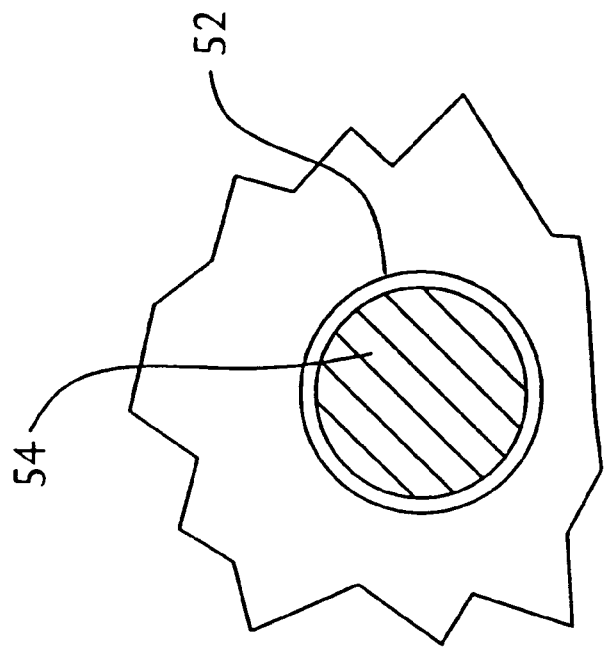
FIGS. 3a and 3b are section views for the maximum and minimum positions as line 3–3 of FIG. 1c for the valve member.
Figure 3A:
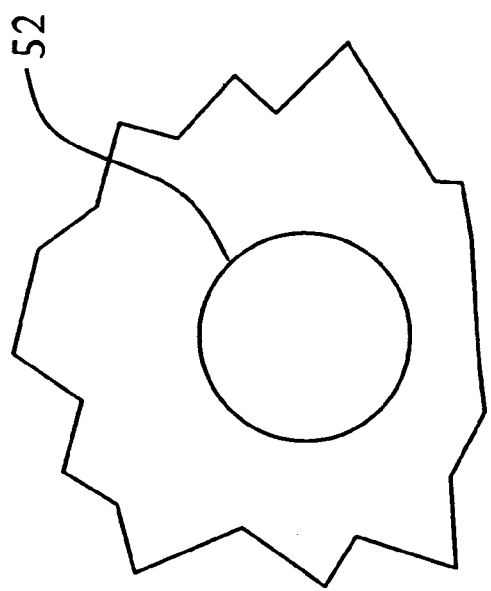

Mounted inside the body 16 is tubular valve member 30. Valve member 30 has an upper bore 32 which is aligned with bore 34 of upper housing 12. Connected to valve member 30 at thread 36 is needle 38. Needle 38 can have a tapered profile, a parabolic profile, or a straight profile. Referring to FIG. 2, the needle 38 has openings 40, 42, 44, and 46, all of which are in fluid communication with bore 32. Any number of openings, such as 40, can be used without departing from the spirit of the invention. Among all the openings and centrally located, as shown in FIG. 2, the needle 48 emerges and extends downwardly along longitudinal axis 50 to throat 52 and lower housing 20. The needle 48 has a taper 54 adjacent its lower end. Thus, when the taper 54 is in the position shown in FIG. 1*d*, the smallest annular opening in throat 52 is created, as shown in FIG. 3*b*. Conversely, when the taper 54 is in its upward position, as shown in FIG. 1*c*, the maximum opening of the throat 52 is available, as shown in FIG. 3*a*. The taper angle and the throat configuration can be varied without departing from the spirit of the invention.

Figure 1B:
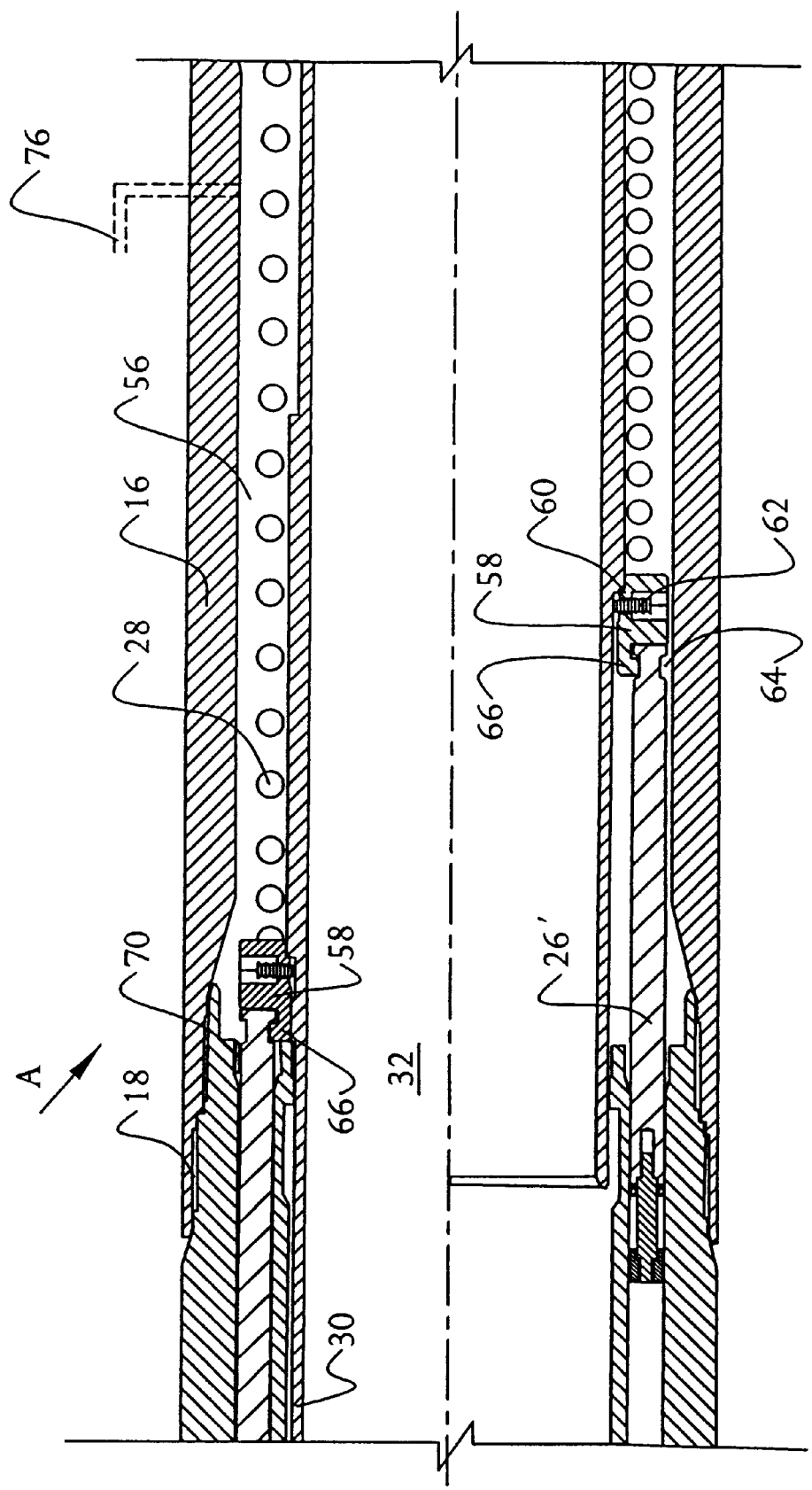

Referring to FIG. 1*b*, the return spring 28 is in an annular cavity 56. Spring 28 bears on upper ring 58, one of which is secured to each of the rod pistons such as 26. Each of the rings 58 has a shoulder 60, which bears on a shoulder 62 on tubular valve member 30. Thus, when pressure is increased in the control line 10, raising the pressure in cavities 24 and like cavities 24', the piston or pistons 26 and/or 26' urge the ring 58 downwardly. It should be noted that each of the pistons, such as 26 and 26', has a groove 64 which accepts a detent 66 to secure the ring 58 collectively to all of the pistons such as 26 and 26' which are used. Each of the pistons 26 has an upper sealing assembly 68 and a lower guide bushing 70. The seal assembly 68 isolates the control line pressures in line 10 from the pressure $P_1$ found upstream of throat 52. Cavity 56 is not sealed from bores 32 or 34, as shown in FIG. 1*c*. The lower end of the spring 28 bears on a ring 72 which rests on and is supported by the lower housing 20. A bushing 74 guides the movement of the valve member 30 and is itself supported from the lower housing 20. In the embodiment shown in FIGS. 1*a*–1*d*, the pressure $P_1$ exists as well in cavity 56. Those skilled in the art can appreciate alternative ways to actuate the valve member 30. For example, a pair of control lines can run down to the surface. One control line 10 is already shown, and another shown in dashed lines as 76 can be in communication with chamber 56 with the proper seals between the valve member 30 and the lower housing 20, as well as between the body 16 and the lower housing 20. Thus, for example, bushing 74 can alternatively be considered to be a seal which will allow replacement completely of spring 28 and actuation uphole of valve member 30 with control line pressure applied to line 76. Alternatively, the spring 28 can be replaced without using a second control line 76 if the chamber 56 is sealed with a fluid under sufficient pressure to withstand the hydrostatic forces expected from the control line 10 acting on piston or pistons 26. In those situations, stroking down of piston 26 will increase the pressure in chamber 56 as its volume is reduced. Withdrawing pressure from the surface in control line 10 will allow expansion of a compressible fluid in chamber 56 to push the valve member 30 in the uphole direction. Even if a pressurized compressible fluid is charged into chamber 56 to act as an uphole force on pistons 26, a return spring such as 28 but considerably less stiff can also be used to assist in returning the valve member 30 to the position where maximum opening at throat 52 is experienced.

Figure 4:
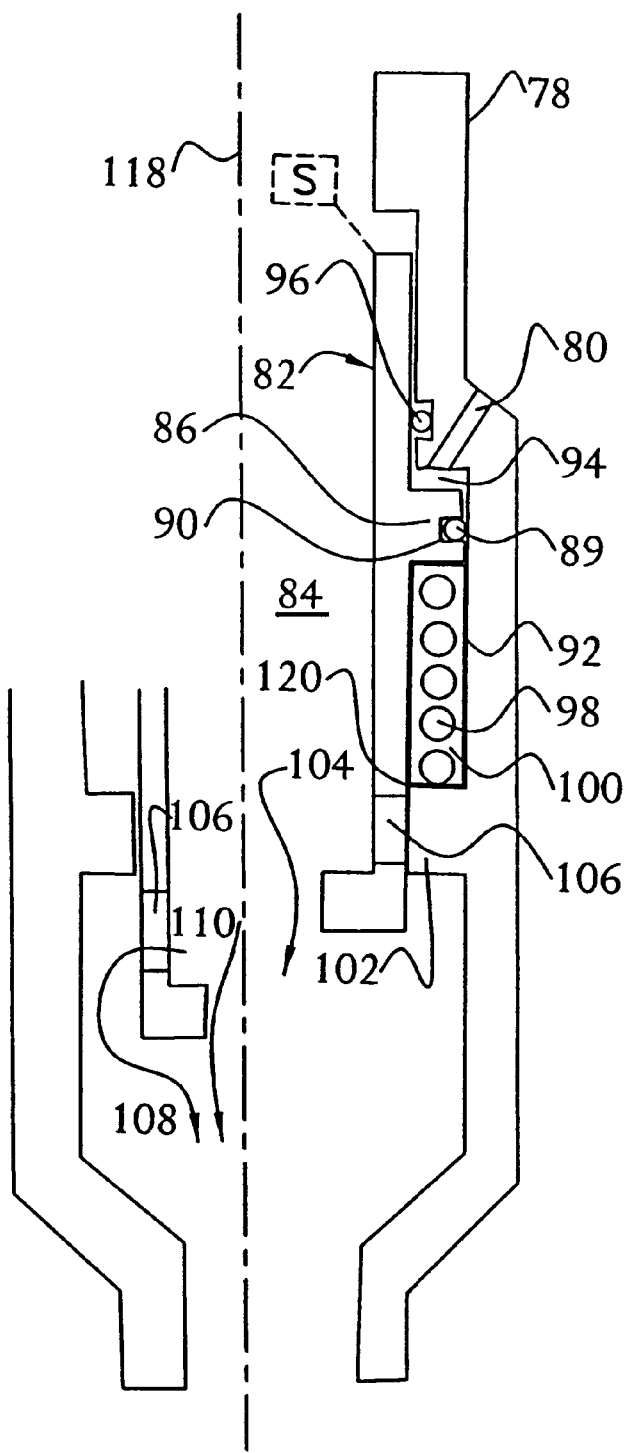
FIG. 4 is split sectional elevational view illustrating an alternative embodiment for the throttling valve of the present invention.

Referring now to FIG. 4, an alternative embodiment is described for accomplishing the same purpose. The drawing of FIG. 4 is somewhat schematic and the alternatives to the driving of the valve member 30 described with regard to FIGS. 1*a*–1*d* are equally applicable to the design of FIG. 4. In FIG. 4, a body is generally shown as 78. A connection 80 accepts a control line from the surface (not shown). The valve member 82 has a central bore 84 and a peripheral tab 86, with an O-ring 88 mounted in a groove 90. O-ring 88 rides on annular surface 92 of body 78 so as to define a variable-volume chamber 94. Seal 96 mounted in body 78 contacts the valve member 82 to sealingly isolate the variable-volume cavity 94. A return spring 98 is in a chamber 100, which is defined between the body 78 and the valve member 82 below variable-volume chamber 94. Body 78 has a circumferential internal projection 102 which serves as a guide for valve member 82 as well as a support for spring 98. The other end of spring 98 bears against circumferential tab 86.

The valve member 82 has a central bore 104 and one or more lateral ports 106. In the right-hand portion of FIG. 4, the ports 106 are in alignment with projection 102 and, hence, effectively sealed off although not necessarily liquid-tight. The opposite end of the movement of the valve member 82 is located on the other portion of FIG. 4, indicating that the lateral ports 106 are now completely below the projection 102. In that position, arrows 108 and 110 reflect the fact that flow occurs through the ports 106 as well as the central bore 104. Whereas in the other extreme position, bore 104 represents the available flowpath for flow. Thus, it can be seen that the embodiment seen in FIGS. 1*a*–1*d*, as well as that shown in FIG. 4, is not intended to be a throttling valve which closes fluid-tight. It can be configured that way, however, without departing from the spirit of the invention. The additional advantage of the embodiment shown in FIG. 4 is that the bore 104 is centrally disposed. Thus, in a particular application where the body 78 is in a tubing string and tools need to be delivered below, the positioning of bore 104 centrally about longitudinal axis 118 allows tools which will fit through bore 104 to be positioned downhole below body 78.

Those skilled in the art will appreciate that the actuation of the valve member 82 can be done in alternative ways. Thus, if a seal 120 is installed, effectively isolating chamber 100, the return spring 98 can be replaced with a pressurized compressible fluid as previously described. Alternatively, an auxiliary connection into the chamber 100, when sealed with seals 88 and 120, can be used to urge the valve member 82 upwardly toward a position bringing in ports 106 into alignment with projection 102 for maximum throttling.

It should be noted that the advantages of the apparatus A of the present invention, as illustrated in the preferred embodiment of FIGS. 1*a*–1*d* and in the alternative embodiment of FIG. 4, are that it can be used as a downhole throttling valve with control from the surface, thus allowing a rangeability in the amount of throttling to react to conditions downhole. While various hydraulic actuation mechanisms for valve members 30 or 82 have been shown, those skilled in the art will appreciate that the movement could also be accomplished by a stepper motor, shown schematically in FIG. 4 as S. The stepper motor S, in combination with power provided from downhole or from the surface, can be used to adjust a position and, hence, the amount of throttling desired. Signals from the surface to the valve member downhole, such as 30 or 82, can be accomplished in a variety of ways, such as through physical movement, acoustical signals, electrical signals, and/or signals transmitted through fiber optic cable, to name a few. The ability to control a downhole throttle valve in real time can improve the functioning of many downhole operations, particularly those for oil and water separation downhole, which are used in conjunction with a downhole pump. Damage to the formation can be minimized or eliminated. When the injectivity of the formation changes, such a change can be sensed by pressures measured in the system or through other means, and a signal from such measurements is generated to be relayed to the control system for the apparatus A. In the preferred embodiment, a single control line 10, acting on a rod piston 26 with a return spring 28, is the simple and preferred solution to variability in the size of the throat 52, which is needed to react to changes in downhole conditions and to control backpressure in the separator. The taper 54 can be altered so as to make the change in open area at throat 52 occur more quickly or more gradually. Needle 54 and throat 52 should be made from erosion resistant materials, such as boronized inconel®, ceramic, tungsten carbide or stellite®. Optionally, the configuration of needle 54 can be such so as to achieve complete shut-off. Seals can also be incorporated into body 20 or taper 54 to facilitate the creation of a bubble-tight shut-off, if necessary.

In a particular example of the apparatus A of the present invention, the open area through openings 40–46 can be approximately 8.36 sq. in., with the maximum flow area at throat 52 being 1.16 sq. in., and the minimum flow area at throat 52 being 0.374 sq. in. In the embodiment shown in FIGS. 1a–1d, the throat size is approximately 1¼" and the stroke length is approximately 5". Other configurations of taper angles 54, throat diameters 52, and stroke lengths can be used without departing from the spirit of the invention.

The preferred embodiment of FIGS. 1a–1d provides a simple and economical apparatus A that can be built cheaply and can operate reliably for precise throttling control downhole from the surface. The embodiment of FIG. 4 adds the advantages of a central bore 104 which can allow tools to pass therethrough for further downhole operations to be conducted through the apparatus A.

The foregoing disclosure and description of the invention are illustrative and explanatory thereof, and various changes in the size, shape and materials, as well as in the details of the illustrated construction, may be made without departing from the spirit of the invention.

What is claimed is:

1. A throttling valve controllable from the surface of a well for downhole use, comprising:
   a body securable to downhole equipment or tubulars;
   a valve member strokable between opposed end positions;
   said valve member translatable in an opening in said body for throttling of a fluid passing through said body as said valve member changes the size of said opening when moved between said opposed end positions;
   said valve member comprising a housing, said housing comprises a needle extending adjacent an opening in said housing such that flow is through said housing and out through said opening in said housing and past said needle and through said opening in said body, said housing and said needle translate in tandem in said body;
   a control system mounted at least in part remote from said body at the surface of said well and operatively controlling said valve member;
   said control system positions and maintains said valve member in at least one position between said opposed end positions.

2. The valve of claim 1, wherein:
   said control system positions said valve member in a plurality of positions between said opposed end positions.

3. The valve of claim 1, wherein:
   said opening in said body comprises a throat.

4. The valve of claim 3, wherein:
   said needle comprises a tapered, straight, or parabolic profile adjacent a lower end thereof.

5. The valve of claim 1, wherein said control system further comprises:
   a stepper motor operatively connected to said valve member and actuated by a signal from said control system.

6. The valve of claim 1, wherein:
   said control system operatively controls said valve member by at least one of the following types of signals: acoustic, electric, physical movement, applied stress, or light.

7. A throttling valve controllable from the surface of a well for downhole use, comprising:
   a body securable to downhole equipment or tubulars;
   a valve member strokable between opposed end positions;
   said valve member movable in an opening in said body for throttling of a fluid passing through said body as said valve member changes the size of said opening when moved between said opposed end positions;
   said valve member comprising a housing, said housing comprises a needle extending adjacent an opening in said housing such that flow is through said housing and out through said opening in said housing and past said needle and through said opening in said body;
   a control system mounted at least in part remote from said body at the surface of said well and operatively controlling said valve member;
   said control system positions and maintains said valve member in at least one position between said opposed end positions;
   at least one piston in said body operably connected to said needle;
   said control system comprises a conduit extending from the surface to said body for selective application of fluid pressure to said piston.

8. The valve of claim 7, wherein:
   a return spring acting on said piston to oppose hydrostatic forces on said piston from said conduit.

9. The valve of claim 7, wherein:
   said body defines a chamber on the opposite side of said piston which contains a compressible fluid which is pressurized to put a force on said piston opposing hydrostatic forces from said conduit extending from the surface.

10. A throttling valve for downhole use, comprising:
    a body securable to downhole equipment or tubulars;
    a valve member strokable between opposed end positions;
    said valve member movable in an opening in said body for throttling of a fluid passing through said body as said valve member changes the size of said opening when moved between said opposed end positions;
    said valve member comprising a housing, said housing comprises a needle extending adjacent an opening in said housing such that flow is through said housing and out through said opening in said housing and past said needle and through said opening in said body;

a control system mounted at least in part at the surface and operatively controlling said valve member;

said valve member comprises a needle movable in said opening of said body;

at least one piston in said body operably connected to said needle;

said control system comprises a conduit extending from the surface to said body for selective application;

a pair of conduits extending from the surface to opposing sides of said position for movement of said piston into a plurality of positions including said end positions.

11. A back pressure control system for a subsurface separator, comprising:

a valve body;

a valve member comprising a translatable needle between and including a fully open and fully closed position in a throat formed in said body;

said valve member comprising a housing, said housing comprises said needle extending adjacent an opening in said housing such that flow is through said housing and out through said opening in said housing and past said needle and through said throat in said body, said housing and said needle translate in tandem in said body;

a control system operable from the surface of a well to stroke said needle and maintain said needle in at least one position between fully open and fully closed.

12. A back pressure control system for a subsurface separator, comprising:

a valve body;

a valve member comprising a movable needle between and including a fully open and fully closed position in a throat formed in said body;

said valve member comprising a housing, said housing comprises said needle extending adjacent an opening in said housing such that flow is through said housing and out through said opening in said housing and past said needle and through said throat in said body;

control system operable from the surface of a well to stroke said needle and maintain said needle in at least one position between fully open and fully closed;

said control system further comprises:

a control line from the surface connected to said body;

said body comprises a piston operatively connected to said needle, said control line communicating a pressure to said piston for selective movement of said needle.

13. The control system of claim 12, wherein:

said piston is biased against forces applied through said control line.

* * * * *